United States Patent Office 3,259,555
Patented July 5, 1966

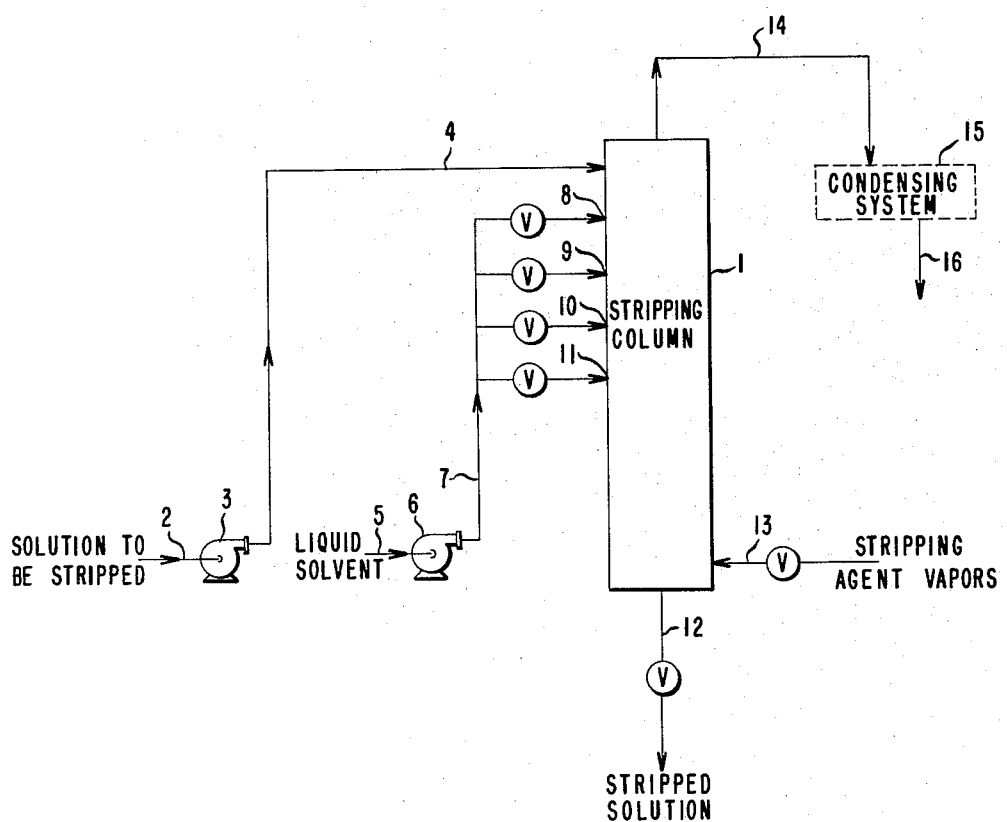

3,259,555
STRIPPING MONOMERS FROM SOLUTIONS
OF POLYMERS
Ralph W. Lankton, North Tonawanda, and John R. Wesel, Lewiston, N.Y., assignors to E. I. du Pont de Nemours and Company, Wilmington, Del., a corporation of Delaware
Filed Apr. 13, 1962, Ser. No. 187,420
7 Claims. (Cl. 203—63)

This invention relates to an improvement in a distillation process. More particularly, this invention relates to an improvement in the process for stripping a volatile component from a solution wherein the viscosity of said solution increases as the said volatile component is removed therefrom.

Simple distillation processes known to the art cannot be utilized efficiently for the stripping of a volatile component from a solution, the viscosity of which increases as the said volatile component is removed therefrom. Such a solution may be obtained by the continuous homogeneous solution polymerization of a monomer wherein it is either not possible or is undesirable for the monomer to be completely polymerized, thereby producing a solution of polymer in solvent containing unpolymerized monomer.

In further processing of the polymer, it is often essential that the residual monomer be removed to yield a solution containing little or no monomer so as to minimize contamination of the polymer product and prevent undesirable side reactions. Also, for reasons of economy, it is advisable to recover the residual monomer for recycle to the polymerizer.

Separation of monomer from the polymer solution can be done by stripping countercurrently with vapors of a suitable stripping agent in a suitable distillation column. A distillation column used for such removal of a volatile component from a solution is commonly called a stripping column. Hence, the terms, "distillation column" and "stripping column" are used interchangeably herein. When the stripping agent used is the same as the solvent used in the polymerization, a portion of the condensed distillate from the distillation column may be directly recycled to the polymerizer. The amount of condensed distillate thus recycled depends upon the monomer concentration in the distillate as well as the monomer concentration required for the polymerizer feed solution. In most cases, it is desirable to obtain the maximum possible monomer concentration in the distillate. The portion of the distillate not recycled directly to the polymerizer must be processed to separate the remaining monomer and solvent.

The polymer solutions are viscous and the viscosity varies not only with molecular weight and configuration of the polymer, but also with concentration of the polymer, as well as temperature. The maximum concentration which can be processed in a particular distillation column depends, therefore, on the specific polymer solution being distilled.

A heat balance must be maintained across the distillation column so that sufficient stripping agent is condensed to prevent the viscosity from exceeding the operable limits and stopping liquid flow. Heretofore, this has been done customarily by returning a portion of the condensed distillate as reflux to the top of the column. However, the monomer in this reflux must be restripped, requiring additional stripping agent vapor, which consequently limits the product capacity of the column.

Viscosity problems can also be overcome by operation at reduced polymer concentrations, but this leads to reduced column capacity since it necessarily increases the liquor flow rate. In other words, a considerable portion of the column's capacity is used to merely process excess solvent. Furthermore, the presence of excess solvent imposes added solvent and monomer processing loads on equipment up and downstream from the stripping column, as does any alteration in operating conditions which produces a leaner distillate with respect to monomer, or a less concentrated polymer solution product.

In some cases, liquid flow rate through a stripping column may be increased by operation of the unit under elevated pressure and temperature. However, use of elevated pressure and temperature is limited by (1) practical structural strength of the equipment employed, and (2) the increased tendency for polymerization, requiring use of higher concentrations of inhibitors, increasing product contamination and cost.

As will be readily recognized, it is very desirable to obtain the greatest possible product flow capacity for a particular design of stripping column, by operation with the lowest possible solvent concentration in the solution being distilled and also by introducing as little stripping agent vapor into the column as possible while maintaining liquid flow through the column.

It is an object of this invention to provide an improved process for stripping a volatile component from a solution, the viscosity of which increases as the volatile component is removed therefrom. Another object is to provide a method in the aforesaid process for maintaining liquid flow of the solution being stripped. Still another object is a method for maintaining relatively uniform viscosity of the solution being stripped in such a process. A further object is to provide increased product flow capacity for a stripping column used in the practice of the aforesaid process. Other objects will be readily apparent from the following description of this invention.

It has now been discovered that in the process for stripping a volatile component from a solution wherein the viscosity of said solution increases as the said volatile component is removed therefrom, said process comprising passing said solution down a distillation solumn counter to upwardly passing stripping agent vapor, removing a vapor mixture containing said volatile component from the upper part of said column, and removing a liquid mixture essentially free of said volatile component from the lower part of said column, surprisingly and unexpectedly the product flow capacity of any specific distillation column may be appreciably increased by the improvement comprising the step of dilution of the said solution passing downward by addition of liquid solvent at least one point below the feed point of the said solution and above the feed point of the said stripping agent vapor.

The attached purely schematic drawing illustrates one embodiment of the present invention and shows how a stripping column may be associated with other units for the efficient stripping of a volatile component from a solution, the viscosity of which increases as said volatile component is removed therefrom. Column 1 in which the stripping takes place is provided with suitable plates or packing as are useful in distillation. The solution containing the volatile component enters the system at 2 by way of solution feed pump 3 and conduit 4 into the upper part of stripping column 1. Stripping agent enters the lower part of the column at 13 from a vaporizer not shown. Liquid solvent enters the system at 5 by way of solvent feed pump 6 and conduit 7 into the column at liquid solvent feed points 8, 9, 10, and 11. A liquid mixture essentially free of the volatile component is removed from the column at 12. If the column is operated under pressure, depressurizing facilities, not shown, are provided for all exit streams. A vapor mixture containing the volatile component is removed from the column and enters a suitable condensing system 15 by way of line 14. Condensed distillate is withdrawn from the condensing system by way of line 16.

The addition point or points for the liquid solvent are selected so as to minimize column vapor flow and maintain the viscosity relatively uniform throughout the column. Distillate composition is controlled to give minimum solvent content.

The exact number of liquid solvent addition points is not critical. Ideally, an addition point at each plate of a plate type tower or at an infinite number of points for a packed column would provide the lowest possible vapor load and most uniform viscosity. On a practical basis, the number of addition points used is based on a balance between cost of piping and complexity of control and the degree of improvement attained.

The invention can be carried out in any standard type of distillation equipment, for example, packed towers, bubble cap plate columns, and sieve plate columns.

In order to gain the maximum benefit from this invention, the liquid solvent fed to the column should be intimately mixed with the processed solution flowing down the column. This will occur naturally in a plate type unit with reasonable effectiveness. For a packed tower, it is usually necessary to provide a distributor plate or a sprinkler-type distribution system at each point where solvent is added. Alternately, mixing facilities can be installed such as a small agitated vessel through which at least a portion of the solution being processed can be by-passed and into which the liquid solvent can be introduced for dilution of the solution before returning the solution to the column.

Normally, in a distillation process wherein the viscosity of the solution being processed remains below 1 poise, viscosity is a relatively unimportant variable. Separation of components from a solution having a viscosity above 1000 poise ordinarily is accomplished by means other than a distillation process. Therefore, this invention finds particular application in distillation processes wherein solution viscosities ranging from 1 to 1000 poises are encountered. As a practical matter, this invention is most applicable in distillation process wherein solution viscosities ranging from 2 to 200 poises are encountered.

In the ordinary application of this invention in a distillation process as described herein, there is no need to recycle a portion of the condensed distillate as reflux to the distillation column. However, use of this invention does not preclude employing such a reflux if so desired.

The following examples serve to illustrate the significant improvements gained by use of this invention and are not to be construed, in any way, as imposing limitations on the scope thereof. Example I represents a typical process as heretofore employed for the stripping of a volatile component from a solution whose viscosity increases as the said volatile component is removed therefrom. Example II shows an application of the present invention in the process of Example I, and illustrates the results obtained thereby.

*Example I*

A plate type stripping column equipped with 50 plates and having a height/diameter ratio of 15.5/1 was used. During operation, the column pressure was maintained at 10 p.s.i.g. A continuous stream of solution at 60° C. comprising 100.0 parts by weight per hour (hereinafter abbreviated as p.p.h.) polyvinyl acetate, 204.0 p.p.h. vinyl acetate monomer and 30.0 p.p.h. methyl alcohol (solution also contained 50 parts per million elemental sulfur as polymerization inhibitor), was diluted with 137.6 p.p.h. of a distillate reflux stream containing 89.4 p.p.h. vinyl acetate and 48.2 p.p.h. methyl alcohol to form a stream at 65° C. comprising 100.0 p.p.h. polyvinyl acetate, 293.4 p.p.h. vinyl acetate monomer, and 78.2 p.p.h. methyl alcohol (hence, about 21% solids), and was fed onto the top plate of the column. The absolute viscosity of the feed stream was determined to be 3 poise. 266.0 p.p.h. of methyl alcohol vapor at 85° C. was fed into the bottom of the column. The temperature in the bottom of the column was 85° C. As analyzed, the base product stream contained about 35% solids: 100.0 p.p.h. polyvinyl acetate, 186.0 p.p.h. methyl alcohol, and less than 1% vinyl acetate monomer. The absolute viscosity of the base product stream was determined to be 30 poise. The viscosity of the solution passing downward in the column was found to have reached a maximum of 39 poise at the 25th plate from the top. The overhead vapor stream contained 65% vinyl acetate monomer and 35% methyl alcohol. The recycle of 137.6 p.p.h. of distillate on reflux to the column was necessary to prevent the solids concentration in the column from exceeding 35%. Because of the monomer concentration requirements of the vinyl acetate polymerizer, only 88.0 p.p.h. of the distillate could be directly recycled to the polymerizer. 226.4 p.p.h. of the distillate was fed to a distillate recovery system for further processing.

*Example II*

The stripping column used in Example I was modified to eliminate the reflux stream; also external piping and control facilities were connected to the 6th and 11th plates (numbering from the top of the column) to permit the flow of a liquid solvent onto those plates from an external source. Other column features remained unchanged and the composition of the feed solution was the same as the undiluted feed used in Example I. A continuous stream of solution at 65° C. comprising 130.0 p.p.h. polyvinyl acetate, 247.0 p.p.h. vinyl acetate monomer, 37 p.p.h. methyl alcohol, and 60 parts per million elemental sulfur (hence, about 30% solids) was fed directly onto the top plate of the column The absolute viscosity of the feed stream was determined to be 30 poises. 38.0 p.p.h. liquid methyl alcohol at 21° C. was fed onto the 6th plate and 80 p.p.h. liquid methyl alcohol at 21° C. was fed onto the 11th plate. 193.0 p.p.h. methyl alcohol vapor at 85° C. was fed into the bottom of the column. The temperature in the bottom of the column was 85° C. As analyzed, the base product contained about 35% solids: 130.0 p.p.h. polyvinyl acetate, 242.0 p.p.h. methyl alcohol, and less than 1% vinyl acetate monomer. As the feed solution passed downward in the column, the viscosity of the solution increased to 45 poises at the 6th plate, at which point by the addition of the liquid methyl alcohol the viscosity was reduced to 22 poises (the minimum viscosity attained in the process). From the 6th plate to the 11th plate, the viscosity of the solution increased to 46 poises (the maximum viscosity attained) at which point the viscosity was reduced to 27 poises by the addition of the liquid methyl alcohol. The absolute viscosity of the base product was determined to be 30 poises. The overhead vapor stream contained 70% vinyl acetate monomer and 30% methyl alcohol. 126.6 p.p.h. of the distillate was recycled directly to the polymerizer and 226.4 p.p.h. of the distillate was fed to a distillate recovery system for further processing.

Several of the improvements obtained by use of this invention are apparent from the foregoing examples. In the column used in these examples, the product flow capacity increased from 100 p.p.h. polymer to 130 p.p.h. polymer, representing an increase of 30%. In Example I, it was necessary to introduce 2.66 parts by weight of stripping agent vapor per 1 part by weight polymer, while in Example II, the ratio of stripping agent vapor to polymer was decreased to 1.48 or a decrease of 42%. Since all of the stripping agent must be vaporized, the decrease in the amount of stripping agent needed resulted in a proportionate decrease in heat load required. Because the concentration of monomer in the distillate increased from 65% to 70%, a greater proportion of the distillate could be recycled directly to the polymerizer and there was no increase in the load on the distillate recovery system.

In Example I, it will be noted that the maximum viscosity of the solution passing downward in the column was 39 poises and the minimum solution viscosity was 3 poises. In other words, the ratio of the maximum solution viscosity to the minimum solution viscosity was 39:3 or about 13. Similarly, in Example II, it will be noted that the ratio of the maximum solution viscosity to the minimum solution viscosity was 46:22 or about 2.1. As used hereinafter in both the specification and the appended claims, the term "viscosity ratio" shall mean the quotient of the value of the maximum absolute solution viscosity divided by the value of the minimum absolute solution viscosity.

The exact amount of liquid solvent added depends on the solution being processed, however, an effective amount should be added so as to prevent the viscosity of the solution from exceeding the operable limits of the stripping column employed. That is, liquid solvent should be added in an effective amount to maintain liquid flow of the solution through the column. It is preferable to adjust the amount of liquid solvent added so as to maintain the viscosity of the solution as nearly uniform as practical. Under ideal conditions, viscosity ratio of 1.0 would be maintained, as occurs naturally in the distillation of solutions in which the viscosity does not change appreciably as the more volatile components are removed. For many stripping operations wherein this invention is applicable, this invention may be used to maintain a viscosity ratio of less than about 7 or preferably less than about 3.

In the foregoing examples, the process of stripping vinyl acetate from a vinyl acetate-polyvinyl acetate-solvent solution was selected as representative of a process for the stripping of a volatile component from a solution whose viscosity increases as the volatile component is removed therefrom, but this invention is not limited to the stripping of such a solution.

Solutions of other polyvinyl esters-vinyl ester monomers may be effectively separated by a stripping process utilizing the present invention. The more common vinyl ester solutions are those which are the solution polymerization products of a vinyl ester of a saturated lower aliphatic carboxylic acid, for example, vinyl formate, vinyl propionate, vinyl butyrate and the like.

Separation of many other monomer-polymer solutions by distillation processes has heretofore not been practical because the viscosity of these polymer solutions greatly increases as the monomer is removed therefrom. However, use of this invention now enables the stripping of monomer-polymer solvent solutions such as those formed by the solution polymerization of styrene, methyl methacrylate and the like.

This invention is not limited to distillation systems involving monomer-polymer solutions. This invention may be effectively used in a distillation process for the stripping of a volatile component from a solution containing a normally solid solute, where the viscosity of the solution increases as the said volatile component is removed therefrom. Furthermore, this invention is not limited to solutions containing a normally solid solute but rather is applicable to the stripping of a volatile component from any multi-component solution, the viscosity of which increases as the volatile component is removed therefrom.

In processes involving a solution containing a dissloved solid such as a monomer-polymer solution, the solid may be dissolved in any compatible solvent. For example, in stripping operations involving a polyvinyl ester, suitable solvents include the lower aliphatic alcohols such as methyl alcohol, ethyl alcohol, and the propyl alcohols; and solvent ethers such as tetrahydrofuran; esters such as methyl acetate, ethyl acetate, and butyl acetate; and hydrocarbons such as toluene, xylene, and benzene. It is also contemplated that the polymer may be dissolved solely in its own monomer and that any other solvent may be used as stripping agent to remove said monomer.

As stripping agent, it is generally preferable to use the solvent in which the solid is dissolved, however, any volatile solvent for the solid can be used. For example, in stripping processes involving a polyvinyl ester, suitable stripping agents include aliphatic alcohols such as methyl alcohol, ethyl alcohol, and the propyl alcohols, and volatile solvent ethers, esters, and hydrocarbons, and any other volatile organic solvent generally, provided that they have suitable boiling points for the operating temperature and pressure of the distillation process. Furthermore, the stripping agent should be a solvent not capable of adverse reaction with the components of the solution being stripped.

It is generally preferable to use as liquid solvent for addition to the column the same solvent as is used to dissolve the solid in the solution being stripped (except in a process where a polymer is dissolved solely in its own monomer), and also as is used for stripping agent, however, any compatible liquid solvent may be used. For example, for the dilution of a polyvinyl ester solution suitable solvents include any volatile organic solvent such as aliphatic alcohols including methyl alcohol, ethyl alcohol, the propyl alcohols, and solvent ethers, esters, and hydrocarbons.

As many apparently widely different embodiments of this invention may be made without departing from the spirit and scope thereof, it is to be understood that the invention is not limited except as defined by the appended claims.

We claim:

1. In the process for stripping unpolymerized monomer from a solution comprising monomer and polymer, said process comprising passing said solution down a distillation column counter to upwardly passing stripping agent vapor, removing a vapor mixture containing said monomer from the upper part of said column and removing a liquid mixture essentially free of said monomer from the lower part of said column, the improvement comprising the step of dilution of the said solution while said solution is passing downward by addition of a liquid solvent for said polymer at at least one point in the upper part of said column below the feed point of the said solution and above the feed point of the said stripping agent vapor.

2. In the process for stripping vinyl ester monomer from a solution comprising vinyl ester monomer and polymerized vinyl ester, said vinyl ester monomer being a vinyl ester of a saturated lower aliphatic monocarboxylic acid, said process comprising passing said solution down a distillation column counter to upwardly passing stripping agent vapor, removing a vapor mixture containing said vinyl ester monomer from the upper part of said column and removing a liquid mixture essentially free of said vinyl ester monomer from the lower part of said column, the improvement comprising the step of dilution of said solution while said solution is passing downward by addition of a liquid solvent for said polymerized vinyl ester at at least one point in the upper part of said column below the feed point of the said solution and above the feed point of the said stripping agent vapor.

3. In the process for stripping vinyl acetate from a solution comprising vinyl acetate and polyvinyl acetate, said process comprising passing said solution down a distillation column counter to upwardly passing stripping agent vapors, said stripping agent being selected from the group consisting of volatile solvent aliphatic alcohols, ethers, esters, and hydrocarbons, removing a vapor mixture containing vinyl acetate from the upper portion of said column and removing a liquid mixture essentially free of vinyl acetate from the lower part of said column, the improvement comprising the step of dilution of the said solution while said solution is passing downward by the addition of a liquid solvent for said polyvinyl acetate at at least one point in the upper part of said column below the feed point of said solution and above the feed point of the said stripping agent vapor.

4. In the process for stripping vinyl acetate from a solution comprising vinyl acetate, polyvinyl acetate and solvent for said polyvinyl acetate, said solvent being selected from the group consisting of methyl alcohol, ethyl alcohol, the propyl alcohols and solvent ethers, esters, and hydrocarbons, said process comprising passing said solution down a distillation column counter to upwardly passing stripping agent vapors, said stripping agent being selected from the group consisting of methyl alcohol, ethyl alcohol, the propyl alcohols, and volatile ethers, esters, and hydrocarbons, removing a vapor mixture containing vinyl acetate from the upper portion of said column and removing a liquid mixture essentially free of vinyl acetate from the lower part of said column, the improvement comprising the step of dilution of the said solution while said solution is passing downward by the addition of said solvent as a liquid at at least one point in the upper part of said column below the feed point of the said solution and above the feed point of the said stripping agent vapor.

5. In the process for stripping vinyl acetate from a solution comprising vinyl acetate, polyvinyl acetate and methyl alcohol comprising passing said solution down a distillation column counter to upwardly passing methyl alcohol vapor, removing a vapor mixture containing vinyl acetate from the upper part of said column and removing a liquid mixture essentially free of vinyl acetate from the lower part of said column, the improvement comprising the step of dilution of the said solution passing downward by addition of liquid methyl alcohol at at least one point below the feed point of the said solution and above the feed point of the said methyl alcohol vapor.

6. The process of claim 5 wherein the said liquid methyl alcohol is added in an effective amount so as to maintain a ratio of the maximum absolute solution viscosity to the minimum absolute solution viscosity of less than about 7.

7. The process of claim 5 wherein the said liquid methyl alcohol is added in an effective amount so as to maintain a ratio of the maximum absolute solution viscosity to the minimum absolute solution viscosity of less than about 3.

References Cited by the Examiner

UNITED STATES PATENTS

| | | | |
|---|---|---|---|
| 1,723,748 | 8/1929 | Primrose | 202—39 X |
| 2,371,342 | 3/1945 | Mayfield | 202—39.5 |
| 2,668,809 | 2/1954 | Bryant et al. | 260—91.3 |
| 2,766,224 | 10/1956 | Bannon | 260—96 |
| 2,878,168 | 3/1959 | Tanner et al. | 202—46 |
| 2,927,065 | 3/1960 | Gerlicher et al. | 202—46 |
| 2,933,900 | 4/1960 | Hanthorn | 62—21 |
| 2,999,053 | 9/1961 | Kramis | 202—46 X |
| 3,068,245 | 12/1962 | Banford et al. | 202—46 X |
| 3,134,726 | 5/1965 | Hochgraf | 202—39.5 |

OTHER REFERENCES

Encyclopedia of Chemical Technology (first supplement 1957), page 703, Interscience, Inc., New York.

NORMAN YUDKOFF, *Primary Examiner.*

GEORGE D. MITCHELL, *Examiner.*

F. E. DRUMMOND, W. L. BASCOMB,
*Assistant Examiners.*